(12) United States Patent
Kaine et al.

(10) Patent No.: US 9,007,524 B2
(45) Date of Patent: Apr. 14, 2015

(54) TECHNIQUES AND APPARATUS FOR AUDIO ISOLATION IN VIDEO PROCESSING

(71) Applicant: Intel Corporation, Santa Clara, CA (US)

(72) Inventors: Greg D. Kaine, Santa Clara, CA (US); Daniel Avrahami, Mountain View, CA (US); Jered B. Wikander, Aloha, OR (US); Gamil A. Cain, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 53 days.

(21) Appl. No.: 13/626,098

(22) Filed: Sep. 25, 2012

(65) Prior Publication Data

US 2014/0085538 A1 Mar. 27, 2014

(51) Int. Cl.
*H04N 7/00* (2011.01)
*H04N 11/00* (2006.01)
*H04N 5/60* (2006.01)
*H04N 9/802* (2006.01)
*H04N 9/82* (2006.01)
*H04N 21/439* (2011.01)
*H04N 21/4728* (2011.01)
*H04R 3/00* (2006.01)

(52) U.S. Cl.
CPC ............... *H04N 5/607* (2013.01); *H04N 9/802* (2013.01); *H04N 9/8211* (2013.01); *H04N 21/439* (2013.01); *H04N 21/4728* (2013.01); *H04R 3/005* (2013.01); *H04R 2201/401* (2013.01); *H04R 2201/403* (2013.01)

(58) Field of Classification Search
USPC .......................................... 348/462; 345/156
See application file for complete search history.

(56) References Cited

U.S. PATENT DOCUMENTS

2012/0293406 A1* 11/2012 Park et al. ..................... 345/156

* cited by examiner

*Primary Examiner* — Jefferey Harold
*Assistant Examiner* — Omer Khalid
(74) *Attorney, Agent, or Firm* — Kacvinsky Daisak Bluni PLLC

(57) ABSTRACT

An apparatus may include a digital display, processor circuit, and an audio isolation component. The audio isolation component may be operative on the processor circuit to identify a selected position on the digital display during presentation of a video, where the video comprises a video stream and two or more audio streams. The audio isolation component may be operative on the processor circuit to generate an audio beam from the one or more audio streams based upon the selected position.

30 Claims, 11 Drawing Sheets

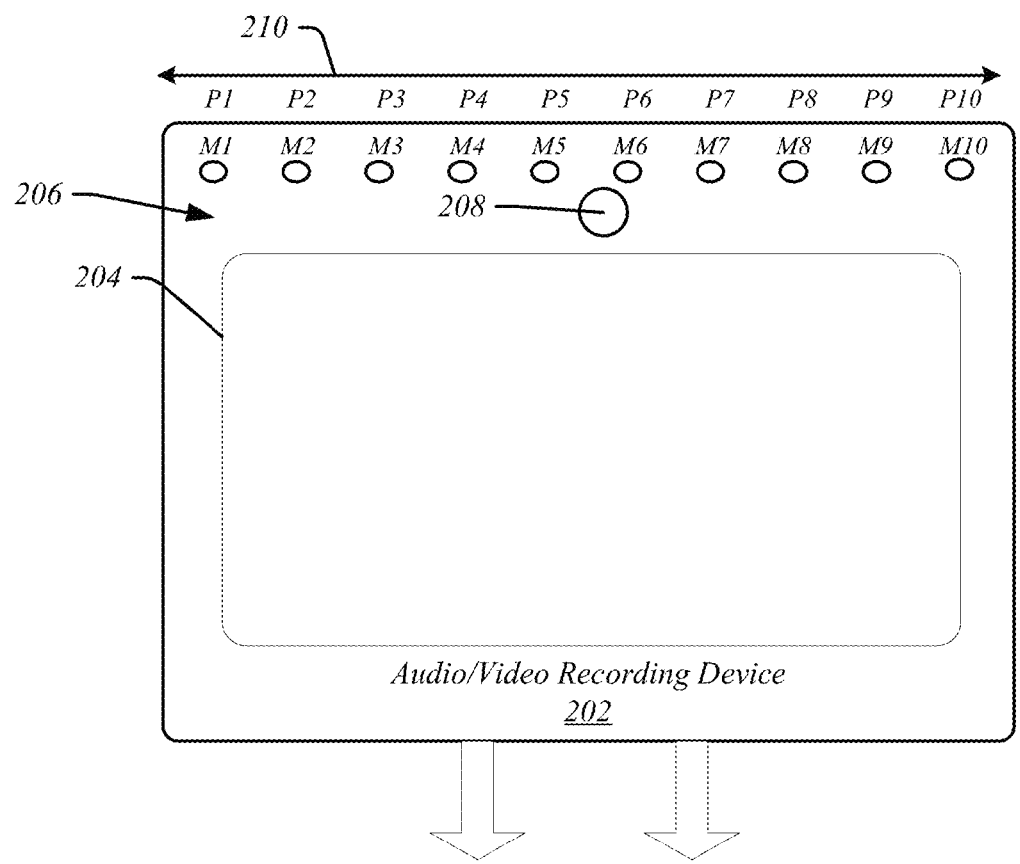
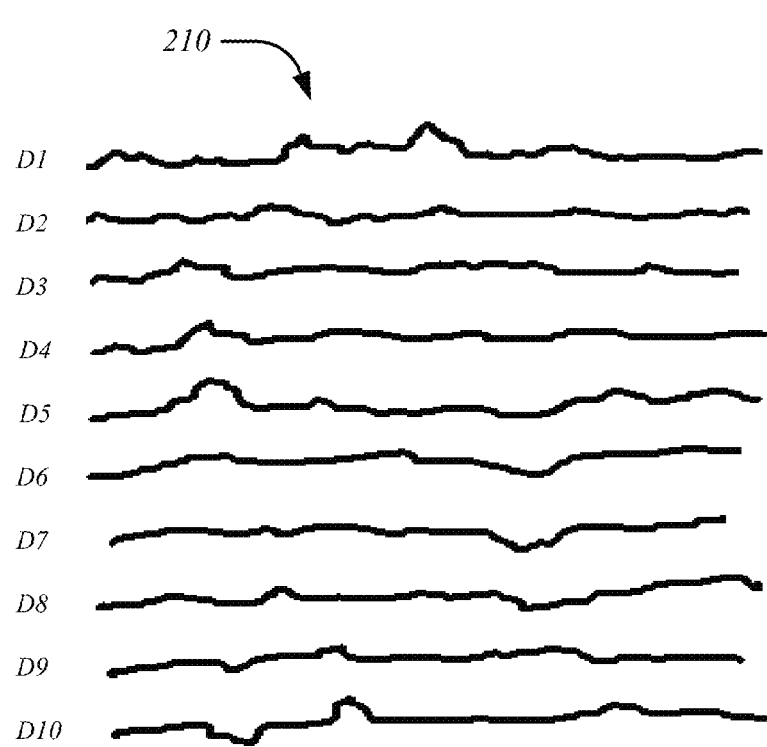
FIG. 2

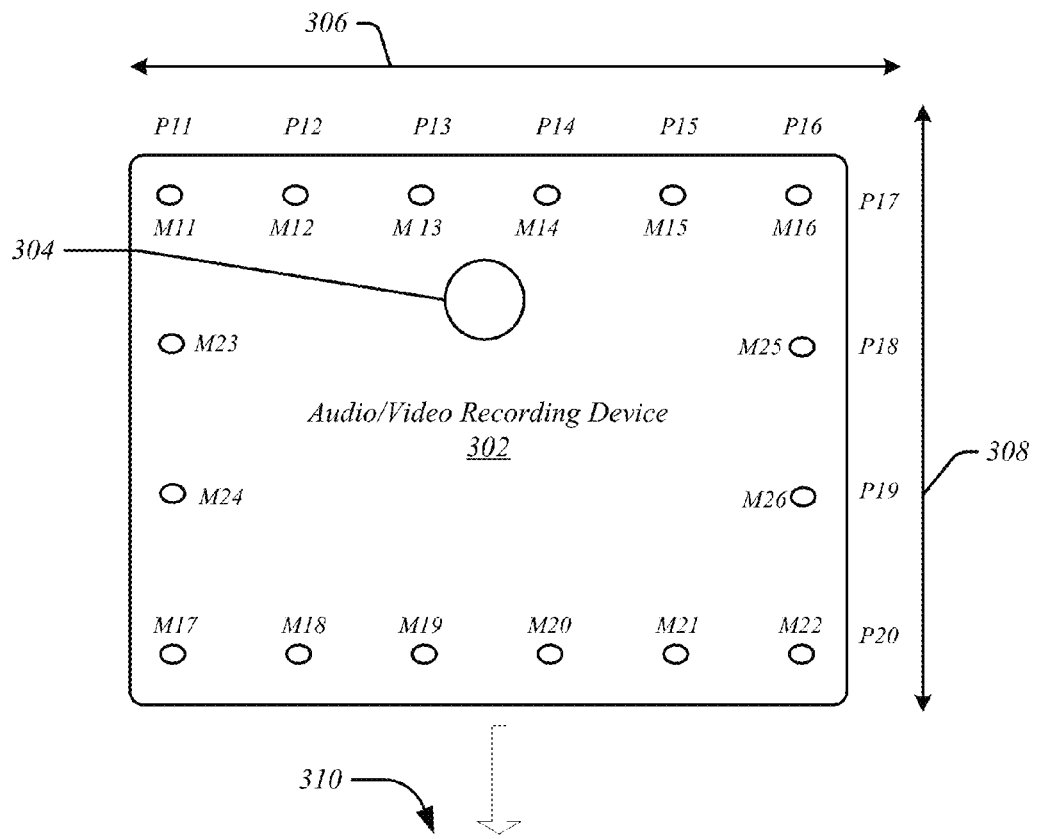
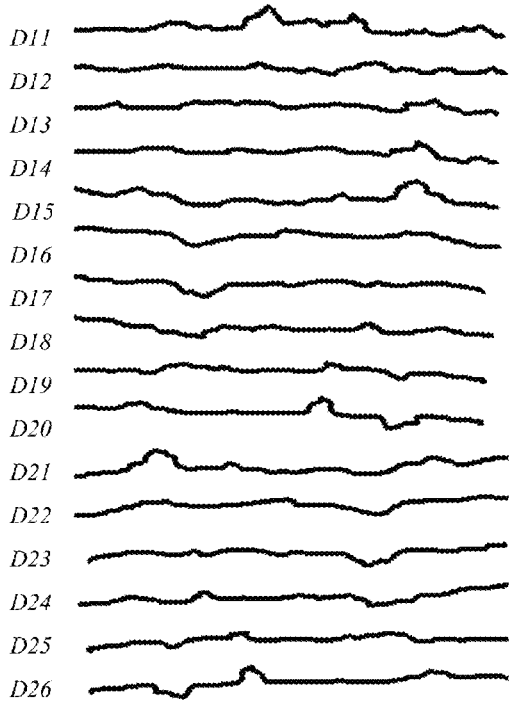
FIG. 3

FIG. 7A
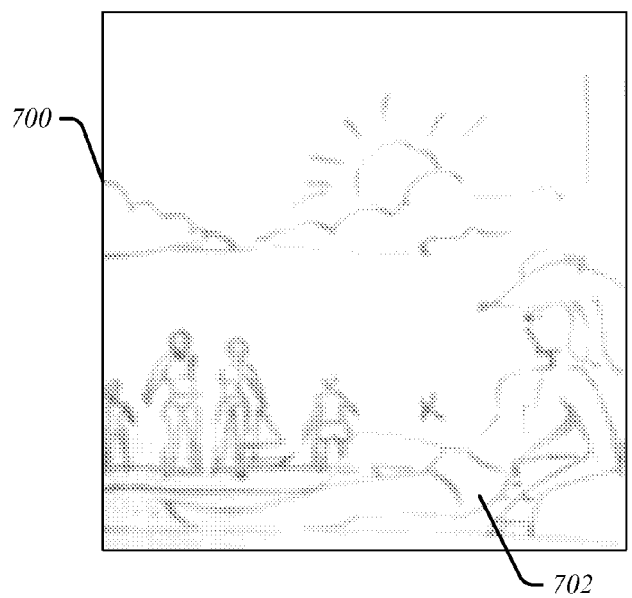
FIG. 7B
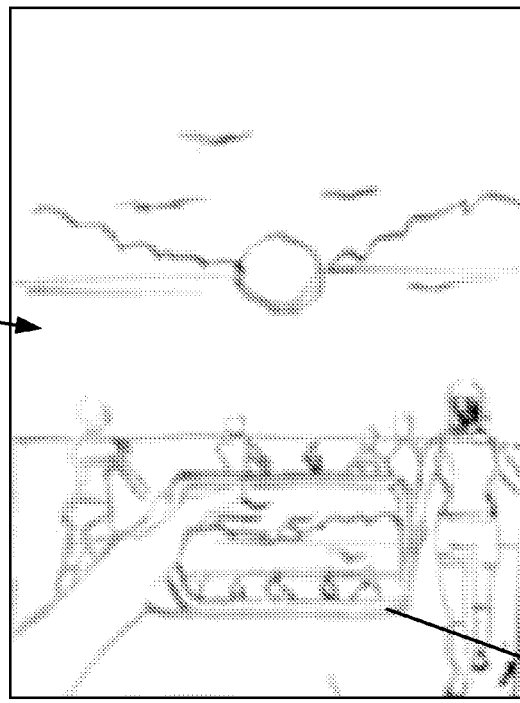
FIG. 7C

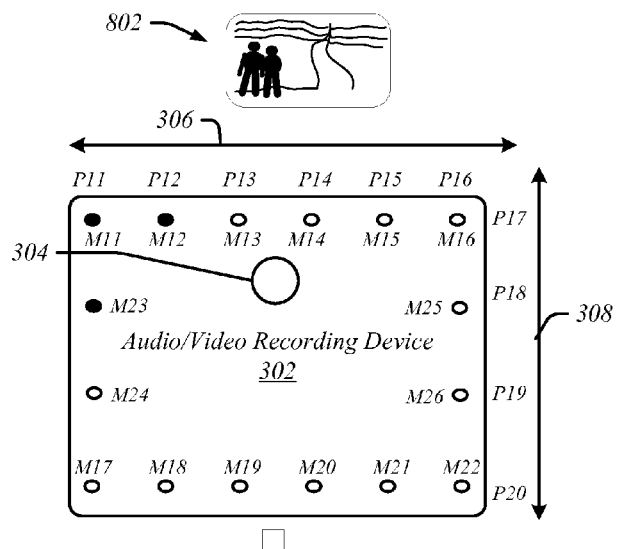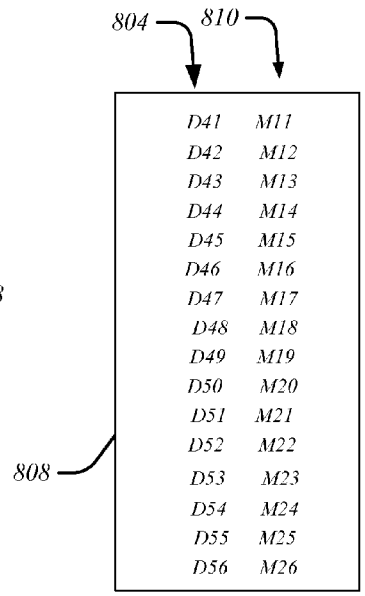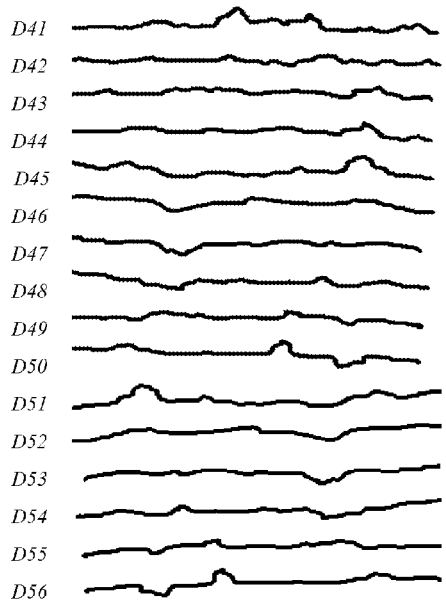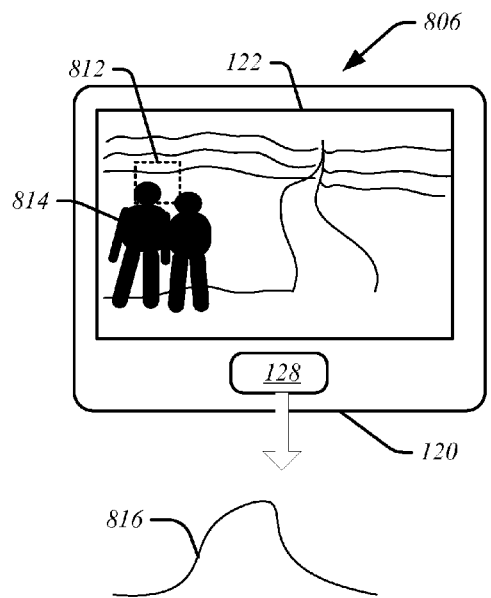
*FIG. 8A*        *FIG. 8B*

TECHNIQUES AND APPARATUS FOR AUDIO ISOLATION IN VIDEO PROCESSING

BACKGROUND

In the present day, it is typical for video content to be recorded with audio content that includes "background" audio that constitutes undesirable sounds. For example, groups of persons, vehicles, other ambient noise, and so forth, may be present when a video is recorded, which distracts from desired audio content. It may therefore be desirable to remove unwanted sources of audio such that only desired audio is heard in such media. Currently, phone devices, computing devices and game consoles may deploy technologies to perform real-time background noise subtraction. However, for a consumer of media, such as a prerecorded video that contains unwanted audio content, current technology does not provide the ability to isolate desired audio such that the unwanted audio is removed while the video is played. Moreover, the ability to select specific audio regions in a video that presents multiple sources of audio may be useful. Accordingly, there may be a need for improved techniques and apparatus to solve these and other problems.

BRIEF DESCRIPTION OF THE DRAWINGS

FIG. 2 depicts operation of an embodiment of a recording apparatus.

FIG. 3 depicts operation of another embodiment of a recording apparatus.

FIG. 7A illustrates a scenario for operation of an exemplary system.

FIG. 7B depicts a user recording a video using a portable device in the scenario of FIG. 7A.

FIG. 7C depicts another perspective of recording video and audio using the portable device of scenario of FIG. 7B.

FIG. 8A depicts another exemplary use scenario illustrating audio isolation.

FIG. 8B depicts audio isolation from the scene using a selective audio play device.

DETAILED DESCRIPTION

Various embodiments are related to methods and apparatus to improve consumption of video media. In particular, methods are related to dynamic audio isolation when a user watches a video. As used herein, unless otherwise noted, the term "video" may refer to media that includes both visual and audio component, in other words, the terms "video" and "audio/video" may be used synonymously. Various embodiments provide the advantages over conventional technology in that audio isolation may take place when media such as a video is consumed by the user after recording of the media.

In some embodiments, audio isolation may be triggered by direct user interaction with a display that presents a video, while in other embodiments the audio isolation may be triggered by a user's visual attention. In various embodiments multiple different audio recording devices are provided in a video recording apparatus so that during recording of a video multiple different audio channels can record a respective multiple different audio streams that differ among one another according to the audio recording device position. In this manner, different audio streams (audio tracks) can be recorded in which the different audio streams comprise different audio signals due to the different recording device positions. As detailed with respect to the FIGS. to follow, during playing of a video stream, an audio beam may be formed from the different audio streams that is correlated with a desired video element or portion of an image in a video when a user provides an indication of the position of the video element. The audio beam thus formed may be selectively played such that unwanted audio may be deemphasized or muted so that a user can view the video while only a desired audio component is output for listening.

Figure 1:
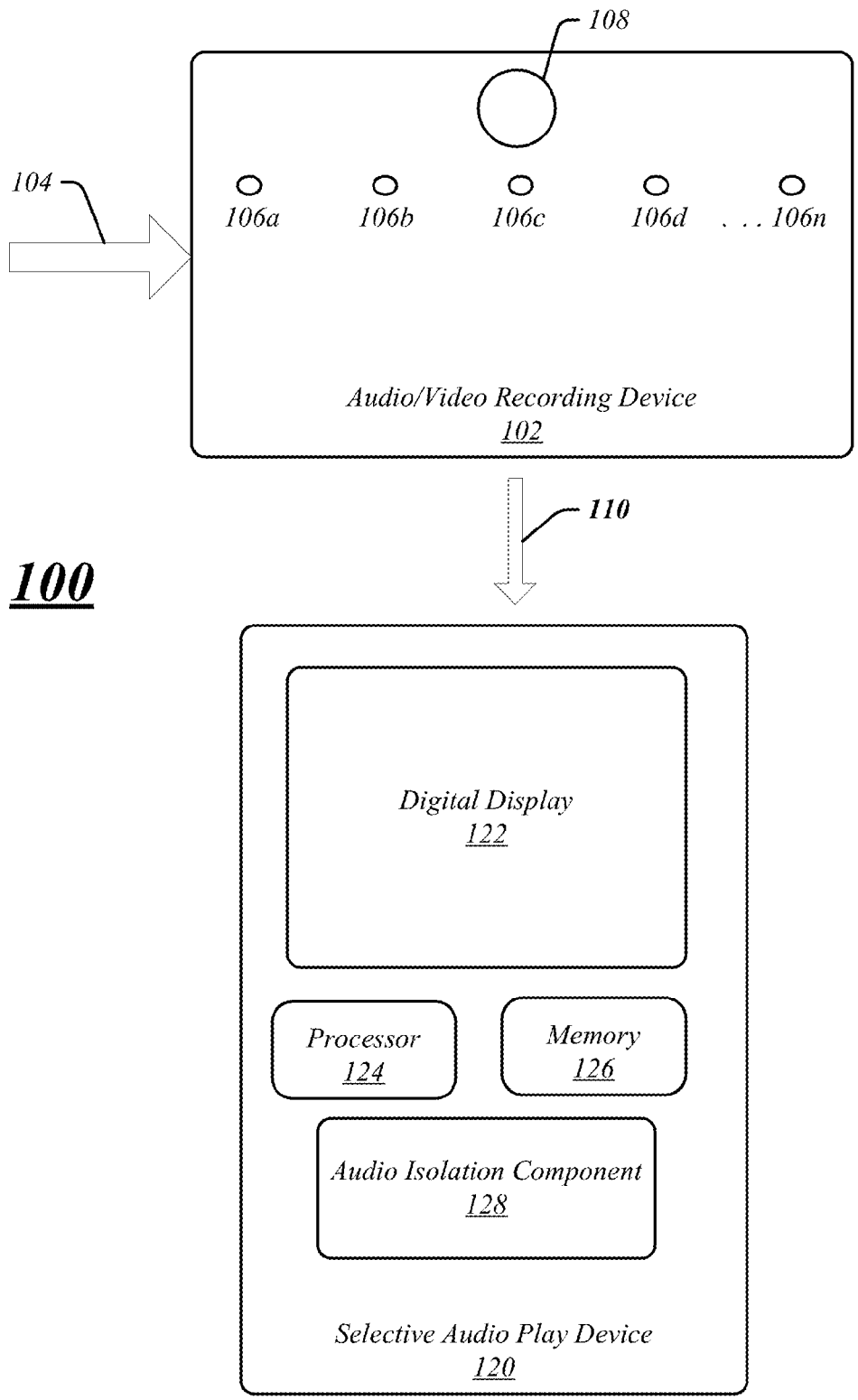
FIG. 1 illustrates a block diagram for an exemplary system.

FIG. 1 depicts a block diagram of a system 100 consistent with various embodiments. The system 100 includes an audio/video recording device 102 for recording a video with accompanying audio, and a selective audio play device 120 to selectively output only a portion of the recorded audio during playing of the video.

The audio/video recording device 102 may be a videocamera, digital camera, computer, notebook computer, tablet computer, mobile phone, smartphone, or other device capable of recording video and audio signals. The embodiments are not limited in this context.

As illustrated in FIG. 1, for example, an event 104 may be received by an array of audio recording devices 106a to 106n, in which the letters a to n may represent any non-zero integer. The audio recording devices 106a to 106n, which may be microphones, are arranged in an array such that each audio recording device is located at a different position on the audio/video recording device 102. In this manner, sound that is generated by external given source such as a person or object travels a different path to each audio recording devices 106a to 106n. The aggregate of all audio streams recorded may be processed to form audio beams that isolate the audio source from a selected region of the display.

When an event 104 occurs, the audio and video from the event 104 that is received by the audio/video recording device 102 may be recorded and/or transmitted as audio/video content 110 to the selective audio play device 120 for playing. For example, the audio/video content 110 may be transmitted as streaming content to the selective audio play device 120 or may be transmitted as a recorded file. In various embodiments, the selective audio play device 120 may be a desktop computer, laptop computer, notebook computer, tablet computer, mobile phone, smartphone, or other device capable of playing a video. In some embodiments, the audio/video recording device 102 and the selective audio play device 120 may be part of a common apparatus, such as a laptop computer, tablet computer or smart phone equipped with audio/video recording devices.

As further depicted in FIG. 1, the selective audio play device 120 includes a digital display 122, processor circuit, or processor 124, memory 126 and audio isolation component 128 whose operation is detailed below.

In various embodiments, the location of objects presented on the digital display 122 may be indicated by a user according to a variety of techniques. For example, an indicating device such as a mouse, touchpad or similar device (not shown) may provide a cursor for selecting an object at a position within a video image presented on the digital display 122. In other embodiments, the digital display may comprise a touchscreen display that is operable according to known processes to receive and respond to user inputs at different locations within a screen. Consistent with the present embodiments, and as detailed below with respect to the FIGS. to follow, in response to user input on the digital display 122 the audio isolation component 128 may be interoperative with the digital display 122 to isolate a portion of multiple audio streams in a video being played on the selective audio play device 120.

In various embodiments, the selective audio play device 120 may execute processing operations or logic for the system 100 using the processor 124. The processor 124 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation In order to receive multiple different audio streams during recording of a video, according to various embodiments, an array of microphones may be arranged in various configurations over an audio/video recording device. FIGS. 2 and 3 depict two respective configurations of an audio/video recording device. FIG. 2 illustrates an audio/video recording device 202 that includes a display 204 and a linear array of microphones M1 to M10 that are provided along a display bezel 206. The audio/video recording device 202 also includes a camera 208 for recording video. As particularly illustrated in FIG. 2, the microphones M1 to M10 are located at a set of respective positions P1 to P10 along the direction 210 that is parallel to a top surface of the audio/video recording device 202. In operation, the audio video recording device 202 may record a video in which multiple audio streams are recorded in conjunction with recording of a video stream. For example, 10 different audio streams that correspond to respective audio received at each microphone M1 to M10 may be detected by the audio/video recording device 202.

As also shown in FIG. 2, the audio/video recording device 202 may generate audio data 210 that includes audio streams D1 to D10, where each audio stream D1 to D10 corresponds to audio detected at a respective single microphone M1 to M10. Each audio stream D1 to D10 thereby represents audio received at a different respective position P1 to P10. As discussed in more detail below, and consistent with various embodiments, audio beam forming may be subsequently performed based on the audio streams D1 to D10. The term "audio beamforming" refers to audio processing based on all audio streams, such as audio streams D1 to D10, in order to isolate sound from a single narrow region (audio beam).

In some embodiments, the audio/video recording device 202 may include components of the selective audio play device 120 so that one or more audio beams may be selectively played during playing of a video that was recorded with the audio streams D1 to D10. The terms "selectively play" or "selectively playing" and as used herein, refer to playing only a portion of a group of audio streams, while suppressing or reducing audio output from another portion of the group of audio streams. Thus, selectively playing a portion of the audio streams D1 to D10 may involve generating an audio beam from the audio streams D1 to D10 and completely suppressing the play of unprocessed audio streams D1 to D10 while playing only the selected audio beam. Alternatively, selective playing may involve increasing volume of a selected audio beam and/or decreasing volume of other portions of a group of unprocessed audio streams D1 to D10. The related term "audio isolation" is used herein to generally refer to identifying a select portion of audio such as an audio beam to be selectively played from multiple audio streams, but may also refer to the process of selectively playing the audio beam.

In various embodiments the modified audio such as one or more audio beams may be saved as an audio file having a standard stereo/mono/5.1 or other format that converts the original multi-audio stream representing the original data recorded by each microphone into a single/multi-channel recording represented by the resultant audio beam(s) selected by user input.

FIG. 3 illustrates another audio/video recording device 302 that includes a camera 304 and a two dimensional array of microphones M11 to M26 provided along a periphery of the audio/video recording device 302. As illustrated, the microphones M11 to M26 corresponds to a two dimensional position in which one position index is defined by the positions P11 to P16 along the direction 306 and a second position index is defined by the positions P17 to P20 along the direction 308. Thus, for example, the microphone M14 corresponds to the position coordinates P14, P17, the microphone M26 corresponds to the position coordinates P16, P19, and so forth.

As also shown in FIG. 3, the audio/video recording device 302 may generate audio data 310 that includes audio streams D11 to D26, where each audio stream D11 to D26 corresponds to audio detected at a respective single microphone M11 to M26. Each audio stream D11 to D26 thereby represents audio received at a different respective position as specified by a pair of positional coordinates as discussed above. The audio streams D11 to D26 may also be processed and/or stored such that one or more audio beams may be formed from the stored audio streams D11 to D26.

Referring again to FIG. 1, the audio isolation component 128 of the selective audio play device 120 is operative to treat individual audio streams of media content such as a video so that one or more audio beams formed from a group of audio streams that accompany video content can be isolated from the unprocessed audio streams. This allows audio beams to be selectively output as sound or suppressed according to user input when a video content is presented on the digital display 122.

Figure 4:
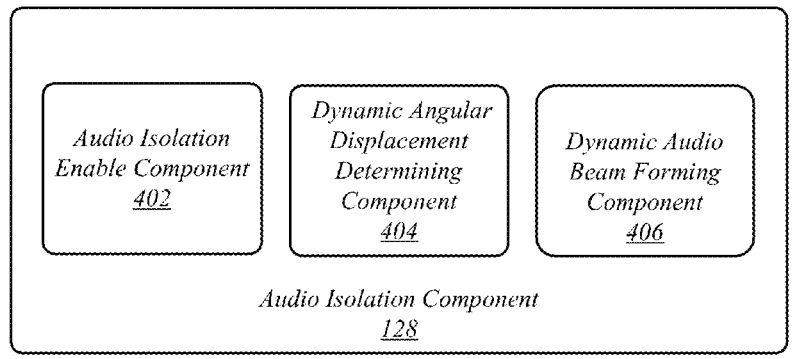
FIG. 4 depicts one embodiment of an audio isolation component.

FIG. 4 illustrates a block diagram of an embodiment of the audio isolation component 128. In various embodiments, the audio isolation component 128 may be implemented in software, hardware or a combination of software and hardware. As illustrated in FIG. 4, the audio isolation component 128 includes an audio isolation enable component 402, which may be employed to enable one or more portions of audio to be isolated while a video is being played on the digital display 122. In one instance, a user may launch a video that includes audio and visual content so that the video appears on the digital display 122, which may include a touchscreen interface. When the audio isolation enable component 402 is launched, the touchscreen interface may be operative to isolate audio beams when a user interacts with the display, such as by contacting the touchscreen interface. The audio isolation enable component 402 may be embodied as an icon or other feature on the digital display or may be selectable through a menu (not shown), and so forth. When invoked, the audio isolation enable component 402 places the selective audio play device 120 in an audio isolation mode in which the user can isolate audio beams of a video as detailed below.

The audio isolation component 128 further contains a dynamic angular displacement determining component 404, which may determine an angle (angular displacement) or direction of an element with respect to a reference in a video based upon dynamic user input.

The audio isolation component 128 also includes a dynamic audio beamforming component 406 that is operative form an audio beam and thereby isolate one or more audio beams collected during recording of a video for output of the audio beams in accordance with the dynamic user input. The operation of dynamic audio beamforming component 406 is further detailed below with respect to FIGS. 5-7g.

Figure 5:
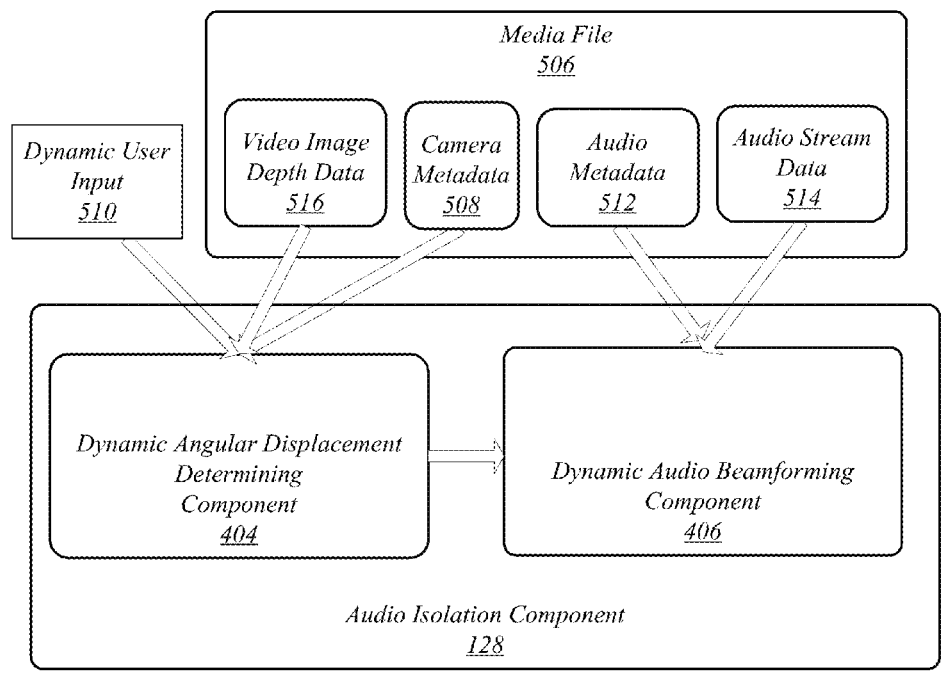
FIG. 5 depicts exemplary inputs for an audio isolation component.

FIG. 5 illustrates various inputs that may be used by the audio isolation component 128 to perform audio isolation. The dynamic angular displacement determining component 404 may receive inputs that facilitate the determination of an angular displacement or direction associated with a selected element in an image that is presented on a display. Once this determination is made, audio beamforming may take place that takes into account the position of the selected element. For example, when a video is presented on display the accompanying audio stream(s) may include sound that is generated by multiple different sources some of which may be displayed in video images that are viewable on the display. The video image may include elements such as a person or persons that occupy a specific region the image, such as a periphery of a video image. A user may desire to selectively play only audio of the person or persons located on the periphery of the image. In response to user input directed to the display, the dynamic angular displacement determining component 404 may determine a direction or angle of audio that arises from such a group of persons in order to isolate that audio. The angle or direction of audio may be specified with respect to a reference, such as a camera lens used to record the video.

As shown in FIG. 5, the dynamic angular displacement determining component 404 may receive dynamic user input 510. The dynamic user input 510 may be, for example, a selection of a specific region in an image or video being presented on a display. The selection may involve user interaction such as manual contact to a position on a touchscreen display that includes the region of interest to the user. Alternatively, the selection may involve use of an indicating device such as a mouse or touchpad to denote a region of interest. In other embodiments, selection may take place by detection of directed eye movement wherein a selected position on a display under the gaze of a user's eye is determined according to known techniques. In further embodiments, the selection may be gesture based or based upon voice command. An example of gesture may be when a user points to a region to be isolated, while a voice command may constitute a verbal request a specific region or object in the video.

Consistent with various embodiments, in response to receiving input at a selected position on a display, the dynamic angular displacement determining component 404 may determine positional indicia for the selected position. An example of such indicia is a set of X-Y display coordinates that provide a two dimensional determination of the selected position. In operation, the dynamic angular displacement determining component 404 may also read data from a media file whose video content is being played on the display. In the example shown in FIG. 5, the media file 506 represents a media file that includes video data (not shown) that generates the video from which the selected region is chosen. As illustrated, the media file 506 includes camera metadata 508, which may include the field of view of the camera used to record the media file 506. For example, a camera lens used to capture video for media file 506 may have a 90 degree field of view.

The dynamic angular displacement determining component 404 may use such information in the camera metadata 508 in conjunction with the received dynamic user input 510 to determine an angle or angular displacement associated with the audio to be played. For example, a center pixel within any image formed in a typical camera lens captures light at a direction (vector) that is perpendicular to the plane of an image sensor having a 2-dimensional angular displacement that may be represented in degrees as (0, 0). On the other hand, pixel locations at edges of the image formed by a camera lens having a 90 degree field of view have an angular displacement of 45 degrees. Thereby, by determining the field of view corresponding to the camera used to record the video of the media file 506, the dynamic angular displacement determining component 404 is capable of determining an angular displacement with respect to a reference for the selected position of a video image that is indicated by the dynamic user input 510. In this example, the reference is the center of a camera lens. In particular, once a selected position on a display is determined based on the dynamic user input 510, the angle or direction of audio corresponding to that selected position may be determined by mapping the coordinates of the display of the selected position to an angle based upon the camera lens characteristics. Thus, a region of interest (selected position) that is selected by a user that lies at the edge of a field of view of a 90 degree FOV camera may be assigned an angle of 45 degrees.

In some embodiments, a media file may include video image depth data 516 that includes depth information of objects recorded in the video. The angular displacement determining component 404 may also receive the video image depth data 516, which may be used to assist in determining an angular displacement of an object based on a select position on a display.

Continuing with the example of FIG. 5, the dynamic audio beamforming component 406 may also retrieve information from the media file 506. As illustrated, audio metadata 512 may be provided within the media file 506. In one example, the audio metadata 512 may include information that indicates that the device used to record the media file 506 included a set of 10 microphones, and may list the relative position of each microphone in the recording device to the other. This information may be employed to map the position of microphones used to record a video to the selected position on a display that presents the video. In particular, by applying a beam forming function to the audio metadata 512 that provides known relative spatial characteristics (indicia) of the microphones an audio beam may be formed. Such a beam forming function may be derived according to known processes.

As further illustrated in FIG. 5, the dynamic audio beamforming component 406 may retrieve audio stream data 514 from the media file 506. In one example, during the recording of the media file 506, a separate audio stream may be recorded for each of 10 different microphones, such that 10 audio streams are contained in the audio stream data 512 retrieved by the dynamic audio beamforming component 406.

In one example the dynamic user input 510 may constitute selection of a region of a video image that is located in a peripheral position on a display screen. Accordingly, the dynamic angular displacement determining component 404 may determine that the corresponding angular displacement of the selected position is +45 degree based on a 90 degree field of view for the recording camera lens, as specified in camera metadata 508. The dynamic audio beamforming component 506 may therefore determine that audio to be played based upon the user input corresponds to an audio beam centered at a +45 degree angular displacement. Moreover, by determining from the audio metadata that the audio stream data 514 is collected from a linear array of 10 different microphones, this may lead to selection of audio centered on a first microphone at the edge of the array. Consequently, audio beamforming may be performed to generate an audio beam from multiple audio streams that is centered on a position associated with the first microphone. The audio beam thus formed may be selected by the audio isolation component 128 for playing.

Figure 6A:
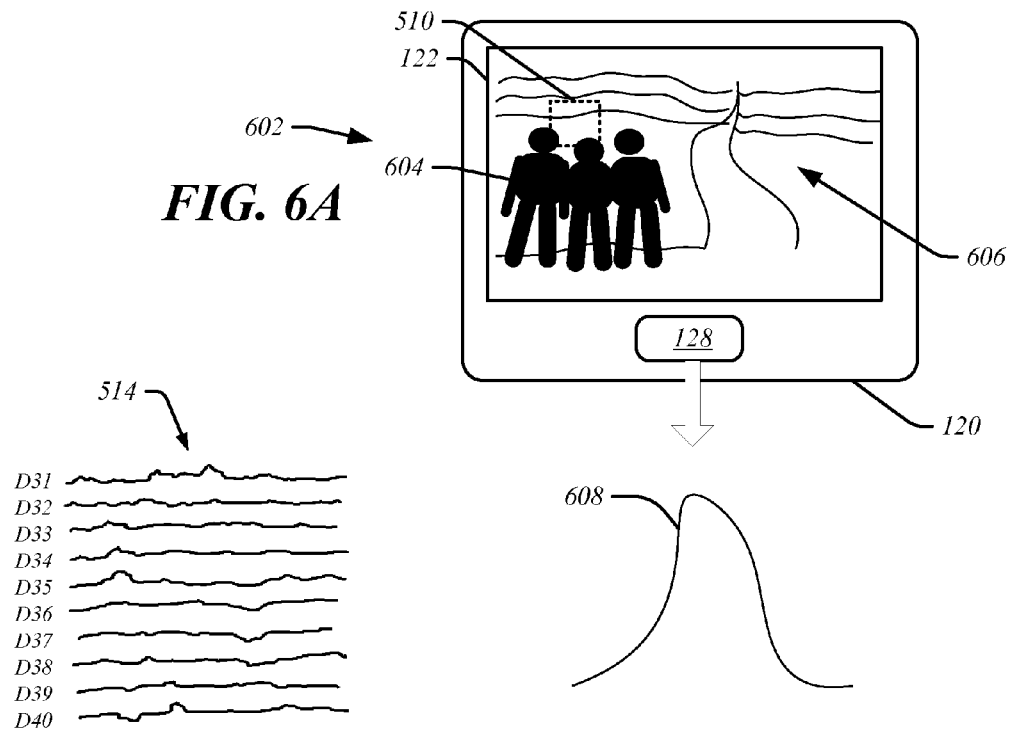
FIGS. 6A illustrates audio isolation during playing a video.
Figure 6B:
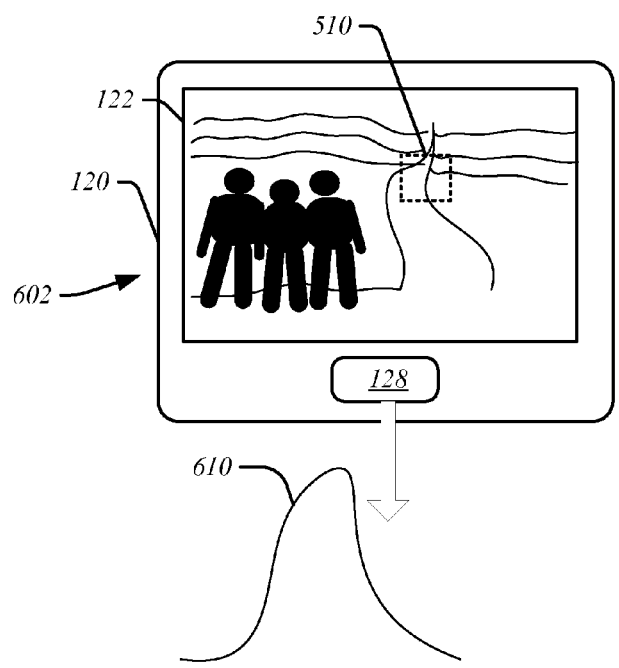
FIG. 6B depicts a subsequent instance of playing the same video as shown in FIG. 6A.

FIGS. 6a and 6b depict one use scenario that further illustrates operation of the audio isolation component 128. Following the example of FIG. 5, the example of FIG. 6a illustrates audio isolation during playing of a video 602. The video includes audio stream data 514 that contains 10 different audio streams D31 to D40. The video 602 depicts an outdoors scene that includes a group of persons 604 and landscape elements 606 including a river. In one example, during the playing of the video 602 by selective audio play device 120, a user may activate the audio isolation component 128 as described above. Subsequently, as shown in the instance depicted in FIG. 6a, a user may interact with a touchscreen surface (not separately shown) on the digital display 122 in order to isolate sound generated from a region of interest to the user. In this manner, instead of continuing to play the entire audio stream data 514 recorded via all microphones within a device used to record video 602, only an audio beam is played that is formed by processing the multiple audio streams based upon user input received on the digital display 122. For example, the user may manually contact a region of the display 122 that presents the image of a group of persons in order to focus on a conversation that may take place between those persons during the recording of the video 602.

As illustrated, the user may contact the region represented by the dashed box and designated as dynamic user input 510. As described above, this input may be employed by the audio isolation component 128 to determine an angular displacement from which an audio beam can be constructed. The audio isolation component 128 consequently may generate signals that isolate one or more audio beams of the audio stream data 514 for playing. In one implementation, an audio beam 608 is formed by processing the one or more audio streams D31 to D40 of the audio stream data 514 in accordance with the determined angular displacement. The audio beam 608 is subsequently played instead of all audio streams D31 to D40 so that the sound corresponding to the desired audio can be more clearly perceived. As shown in FIG. 6a, the audio beam 608 may be derived from the angular displacement corresponding to the selected position shown as dynamic user input 510.

In addition to allowing a user to emphasize audio from a select position during playing of a pre-recorded video, the present embodiments also allow the select portions of audio to be dynamically changed during viewing. FIG. 6b depicts a subsequent instance of playing the same video 602 as shown in FIG. 6a. In this instance, the dynamic user input 510 is shifted to a different position on the digital display 122, which corresponds to an area of the video 602 that depicts a river. In this case, a user may touch the display in the region showing the river so that the sounds generated by the river are more clearly heard. The audio isolation component 128 consequently generates an audio beam 610 instead of output of unprocessed audio streams D31 to D40 of the audio stream data 514.

Figure 7D:
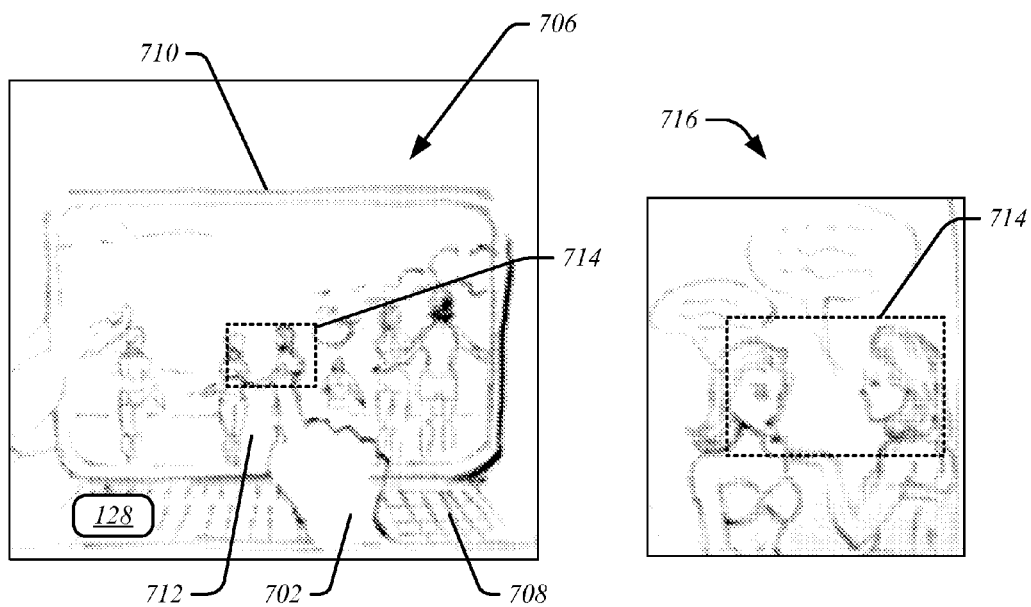
FIG. 7D depicts exemplary audio isolation during playback of a video recorded in the scenario of FIGS. 7A to 7C.

FIGS. 7a-7g depict another use scenario in which a video is recorded on a first device and subsequently played back on a different device. In FIG. 7a, a user 702 is depicted at the beach. Subsequently, as shown in FIG. 7b, the user 702 records a video that documents her experience at the beach using a portable device 704. Consistent with the present embodiments, the portable device 704 includes multiple microphones to record a corresponding set of multiple audio streams as generally described above with respect to FIGS. 2 to 6b. As shown in FIG. 7c, the portable device 704 may record video and audio from the beach scene 706.

Figure 7E:
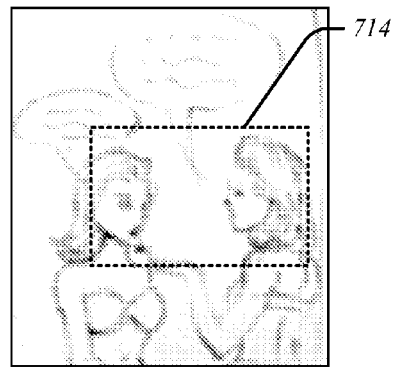
FIG. 7E.*depicts* details of isolation of audio in the scenario of FIG. 7D.

Subsequently, as shown in FIGS. 7d to 7g, the user may play the recorded video 706 on a laptop computer 708 that includes the display 710. The laptop computer 710 includes an audio isolation component so that select audio beams can be played from among the multiple audio streams recorded as part of the recording of the video 706. For example, in an instance illustrated at FIG. 7d, the user 702 may wish to focus in on sound associated with a group of friends 712. The user 702 then activates the audio isolation component 128 and touches the region 714. The audio isolation component 128 performs audio isolation as generally described above with respect to FIGS. 4 to 6b, resulting in the isolation of audio 716 from the friends' conversation, as shown in FIG. 7e. In this instance, audio associated with visual elements that are not found within an angular range corresponding to the region 714 may be suppressed.

Figure 7F:
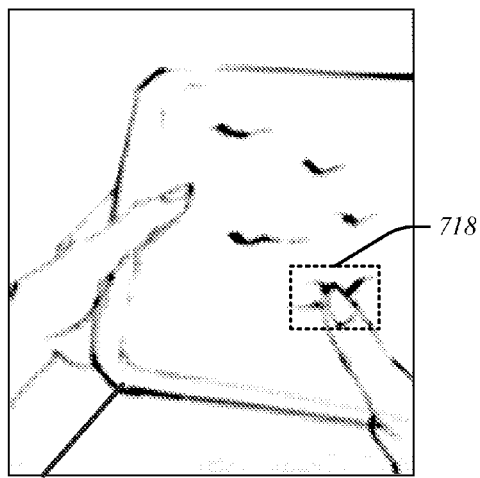
FIG. 7F depicts another example of audio isolation during playback of the video recorded in the scenario of FIGS. 7A to 7C.
Figure 7G:
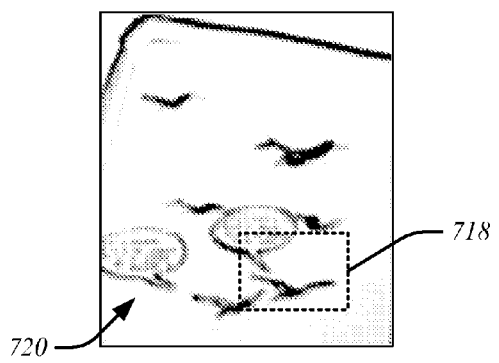
FIG. 7G depicts details of isolation of audio in the scenario of FIG. 7F.

Subsequently, the user 702 may wish to listen to audio generated by other elements of the video 702. As shown in FIG. 7f, the user selects region a region 718 that includes seabirds, resulting in the selective output of bird calls 720, as shown in FIG. 7f.

In addition to the ability to isolate desired audio from among multiple sources of audio within a video, the present embodiments provide various additional advantages. For example, as illustrated above with respect to FIGS. 6a, 6b and 7a-7g, the source of desired audio within a video can be dynamically changed while playing a video when a user touches a different portion of a touchscreen or otherwise interacts with the display. This may be particularly useful when the position of an object of interest changes within the field of view of the video being presented. For example, a user may track a conversation by a group of persons that move within the field of view of a video by changing retouching the display screen in the current region where the persons are located. In this manner, the appropriate audio beams(s) to capture the conversation are generated to reflect the changing angular position of the persons with respect to an array of microphones during the recording of the video.

The present embodiments also facilitate the ability to conveniently edit audio portion of a video. For example, in one embodiment, a video may be recorded in a noisy environment using audio/video recording device 102. A user may subsequently playback the video on a selective audio play device 120 in an editing mode. During the editing mode the user may isolate portions of audio during playback as described above. The selective output of chosen audio beams thus generated by the user interaction may be saved as a new audio track for the video. In this manner, extraneous or unwanted audio may be selectively removed in a convenient fashion.

In various other embodiments, audio may be isolated in real time during recording of a video via user interaction with a display of the recording device. For example, a user may employ the audio/video recording device 202 to present the video on a display in real time during recording. By interacting with a select position of display 204, the user may isolate audio associated with objects within the select position of the display 204. In this manner audio recorded by some microphones of the array of microphones M1 to M10 may be stored in memory of the audio/video recording device 202, while audio recorded by other microphones is discarded.

In further embodiments, an audio isolation component may operate to route audio beam for output in a device that has a multichannel speaker such that the audio beam is output at one or more speakers of the set of multichannel speakers based upon the spatial position of the one or more speakers.

The present embodiments additionally cover scenarios in which two-dimensional angular displacement of a selected position on a display is determined. For example, referring again to FIG. 3, two different angular displacements with respect to the center of a field of view of the camera 304 can be defined along mutually perpendicular directions 306 and 308 for any user-selected portion of an image that was recorded by the audio/video recording device 302. Once a set of two angular displacements is defined for the user-selected portion of an image in the video, these can be used to map to the appropriate set of microphones of the microphones M21 to M36 from which to generate audio beams from recorded audio streams to output audio.

FIGS. 8a and 8b illustrate one embodiment in which the determination of two dimensional angular displacement is used to perform audio isolation for a video that contains multiple audio streams. As illustrated in FIG. 8a, a scene 802 is recorded by the audio/video recording device 302. An audio portion 804 of the audio/video being recorded received by the microphones M11 to M26 may be stored as a set of respective audio streams D41 to D56. Each audio stream D41 to D46 corresponds to audio recorded at a different two dimensional angular displacement with respect to a reference, such as the center of the lens of camera 304. Subsequently, when a user plays video that contains the audio 804, one or more of the audio beams generated from the audio streams D41 to D56 may be isolated for playing based upon user input.

FIG. 8b depicts audio isolation during playing of the video 806 recorded from the scene 802 using the selective audio play device 120 described above. FIG. 8b also illustrates a data structure 808 that includes audio recording device metadata 810 that specifies the microphones M11 to M26. As illustrated the data structure 808 maps the audio streams D41 to D56 of the audio 804 to respective microphones M11 to M26. During playing of the video 810 the user may touch the region 812 of digital display 122 in order to isolate conversation from the group of persons 814. The audio isolation component 128 is thereby triggered to perform a determination of the angular displacement corresponding to the region 812. The angular displacement may be calculated with respect to the center of the field of view of camera 304 in 2-dimensions that correspond to the directions 306, 308 discussed above. For example, the audio isolation component 128 may determine that the location of region 812 corresponds to an angular displacement that defines an audio beam centered on a location that is most closely approximated by the positions P12, P18 of the audio/video recording device 302. Accordingly, the audio isolation component 128 may thereby generate an audio beam for selective output based upon a two dimensional angular determination for the set of positions P12, P18. As shown in FIG. 8b, the audio beam 816 is output by the selective audio play device 120, while the unprocessed audio streams D41-D56 are not output.

Although the focus in the above description concerns embodiments in which audio isolation is associated with a single region of a video image, other embodiments contemplate performing audio isolation for multiple regions within a video image. For example, during playback of a video a user may enable an audio isolation component 128 and touch multiple areas within a display to isolate audio associated with objects presented in the multiple areas. The ability to provide audio isolation for multiple regions may be enhanced for devices having a greater number of separate audio recording devices available to record audio. As the number of separate audio recording devices in an array of audio recording devices increases, the minimum angular range of an audio beam may be decreased, thereby improving the ability to isolate audio associated with objects from a given region of a video image. Thus, the present embodiments contemplate the use of media files for video recording that support the storage of large numbers of separate audio streams (tracks).

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
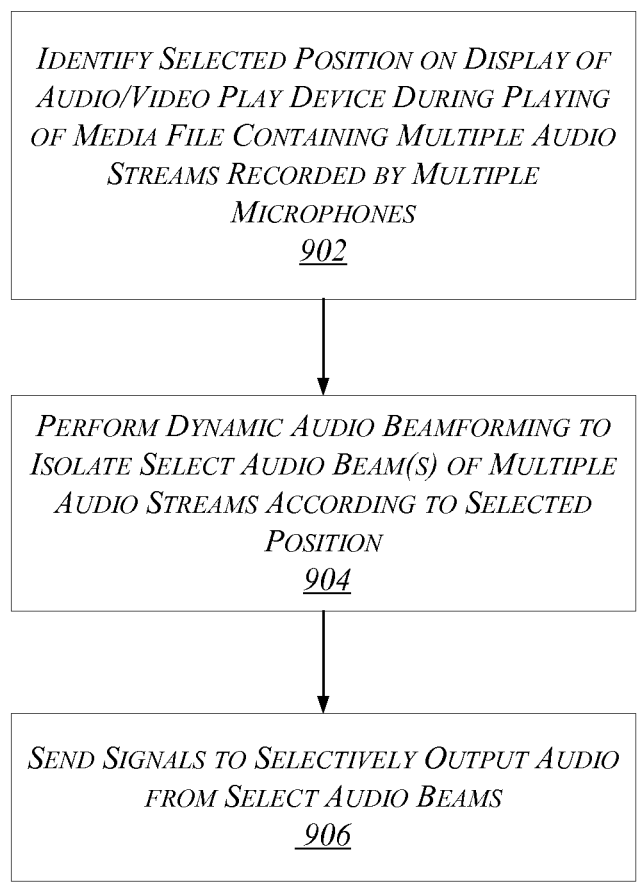
FIG. 9 presents an exemplary first logic flow.

FIG. 9 illustrates an exemplary logic flow 900. At block 902, a selected position is identified on a display of an audio/video play device during play of a media file that contains multiple audio streams recorded by multiple different microphones. In one example, the media file is recorded by an array of microphones in an audio/video recording device. The position of each microphone may define a different angular displacement with respect to a center of a field of view of a camera of the audio/video recording device. The position may be identified by determining an X-Y coordinate that is selected on the display, such as by engaging a touchscreen that forms part of the display or by employing an electronic indicating device, such as a mouse.

At block 904 dynamic audio beamforming is performed to isolate select audio beams that are part of multiple audio streams according to the selected position. For example, the determination of the select audio beams may be accomplished by mapping the selected position on the display to the angular displacement of the selected position.

At block 906 signals are sent to selectively output audio from the select audio beams. In one example, audio output from unprocessed audio beams may be reduced or terminated if already present at the time the select audio beams are isolated.

Figure 10:
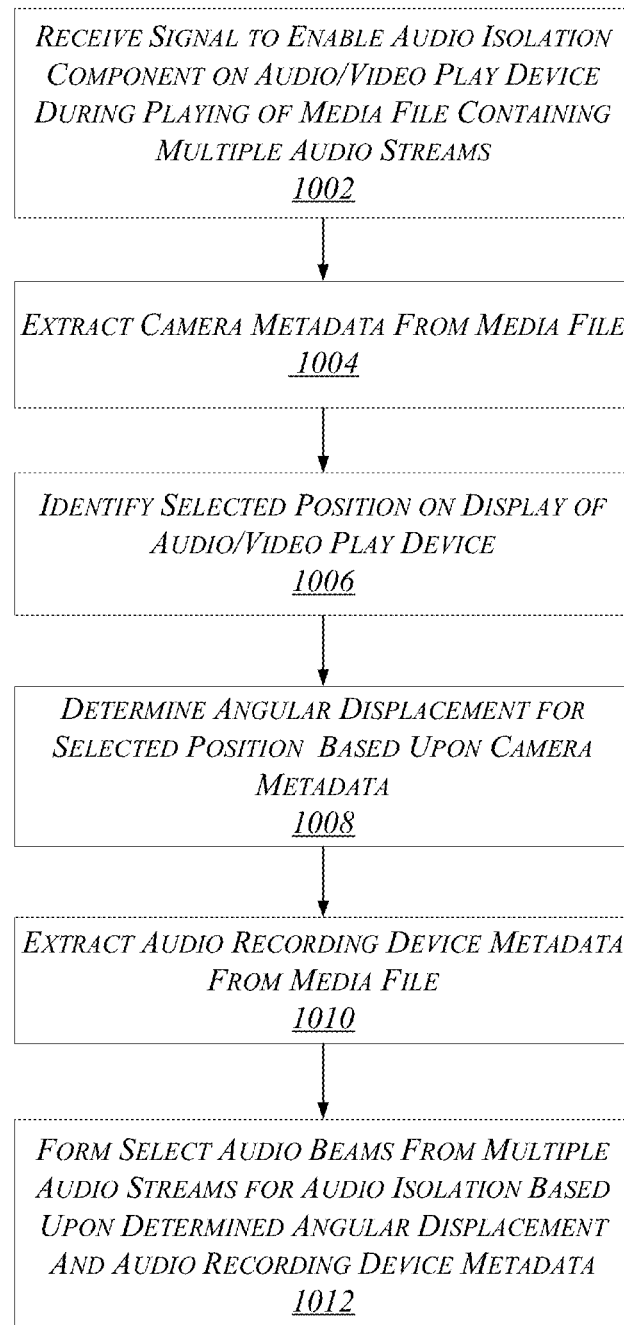
FIG. 10 presents an exemplary second logic flow.

FIG. 10 presents an exemplary second logic flow 1000. At block 1002, a signal is received to enable an audio isolation component in an audio/video play device during playing of a media file that contains multiple audio streams. The flow then proceeds to block 1004, where camera metadata is extracted from the media file. As an example, the camera metadata may specify lens properties of the camera of an audio/video recording device that recorded a video portion of the media file.

At block 1006, a selected position on a display of the audio/video play device is identified. At block 1008, an angular displacement is determined for the selected position based upon the extracted camera metadata. For example, the camera metadata may specify a field of view of the camera, which thereby allows an X,Y displacement of the selected position with respect to the center of the video image to be mapped to a corresponding angular displacement with respect to the center of the camera lens that recorded the image.

At block 1010, audio recording device metadata is extracted from the media file. The audio recording device metadata may include the X-Y position of each microphone of an array of microphones of the audio/video recording device. The flow then moves to block 1012 where select audio beams are generated from the multiple audio streams for audio isolation based on the angular displacement and audio recording metadata.

Figure 11:
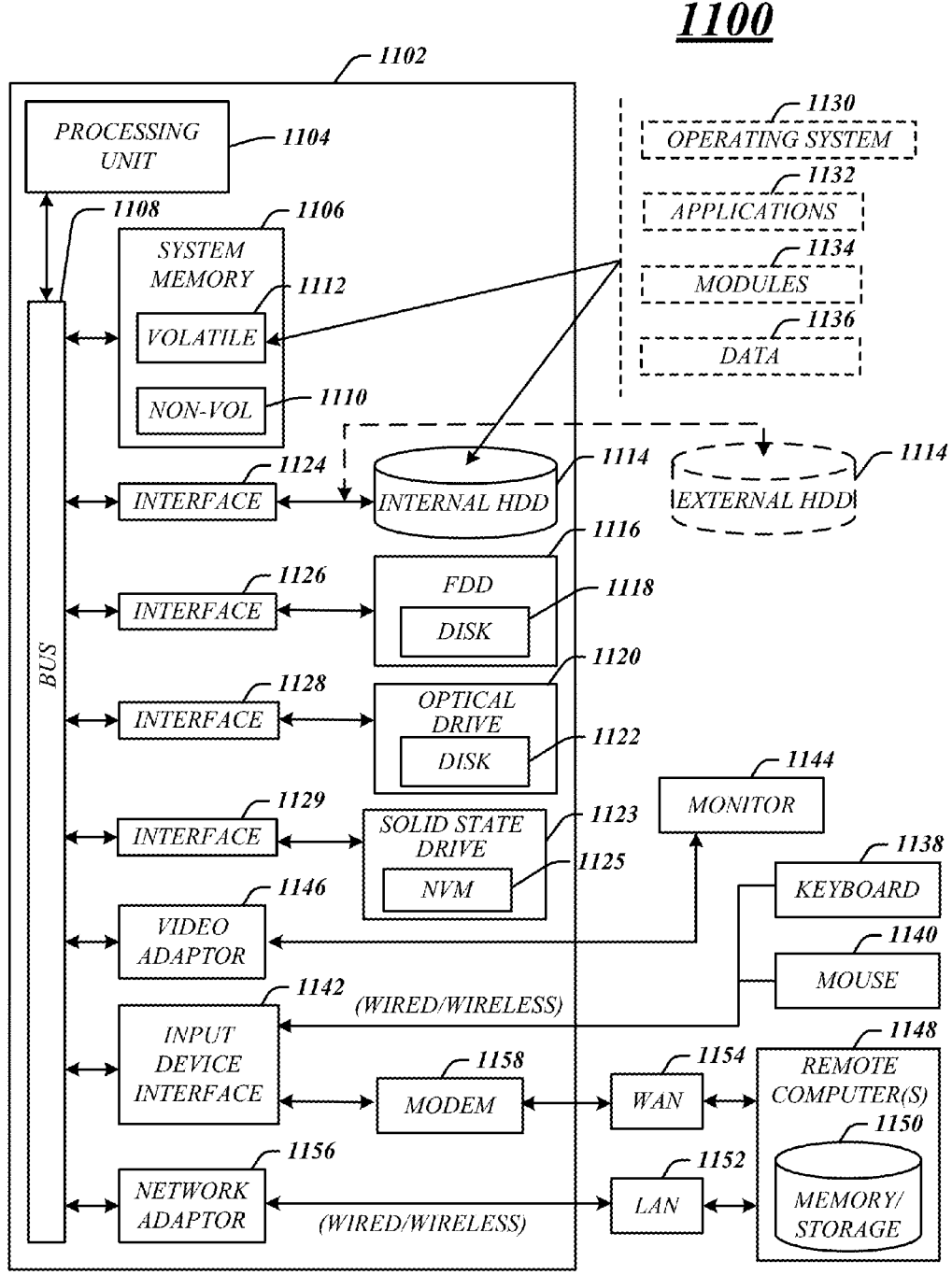
FIG. 11 is a diagram of an exemplary system embodiment.

FIG. 11 illustrates an embodiment of an exemplary computing architecture 1100 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1100 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1100 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors. Dual microprocessors and other multi-processor architectures may also be employed as the processing unit 1104. The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures.

The computing architecture 1100 may comprise or implement various articles of manufacture. An article of manufacture may comprise a computer-readable storage medium to store logic. Embodiments may also be at least partly implemented as instructions contained in or on a non-transitory computer-readable medium, which may be read and executed by one or more processors to enable performance of the operations described herein. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1094 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136.

A user can enter commands and information into the computer 1102 through one or more wire/wireless input devices, for example, a keyboard 1138 and a pointing device, such as a mouse 1140. Other input devices may include a microphone, an infra-red (IR) remote control, a joystick, a game pad, a stylus pen, touch screen, or the like. These and other input devices are often connected to the processing unit 1104 through an input device interface 1142 that is coupled to the system bus 1108, but can be connected by other interfaces such as a parallel port, IEEE 1094 serial port, a game port, a USB port, an IR interface, and so forth.

A monitor 1144 or other type of display device is also connected to the system bus 1108 via an interface, such as a video adaptor 1146. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In one embodiment, an apparatus may include a digital display and processor circuit. The apparatus may also include an audio isolation component operative on the processor circuit to identify a selected position on the digital display during presentation of a video, the video comprising a video stream and two or more audio streams, and generate an audio beam from the one or more audio streams based upon the selected position.

In a further embodiment the audio isolation component may be operative on the processor circuit to identify the selected position by determining a position on the digital display corresponding to manual touchscreen input, input by an electronic indicating device, input by directed eye movement, gesture based input, or voice command input.

Alternatively, or in addition, in a further embodiment the multiplicity of audio streams may comprise audio recorded from an array of microphones comprising a linear array or a two dimensional array.

Alternatively, or in addition, in a further embodiment the audio isolation component may be operative on the processor circuit to determine an angular displacement of the selected position, receive audio metadata that includes spatial indicia of microphones used to record the two or more audio streams, and generate the audio beam by applying a beam forming function to the audio metadata.

Alternatively, or in addition, in a further embodiment the audio isolation component may be operative on the processor circuit to receive camera metadata including a field of view of a camera that recorded the video and to determine the angular displacement of the selected position based upon X-Y display coordinates and the field of view.

Alternatively, or in addition, in a further embodiment the audio isolation component may be operative on the processor circuit to receive depth information for a visual element associated with the selected position, and to determine the angular displacement based upon the depth information associated with the visual element.

Alternatively, or in addition, in a further embodiment the audio isolation component may be operative on the processor circuit to determine X-Y coordinates of the selected position by tracking eye movement of a user proximate the display.

Alternatively, or in addition, in a further embodiment the audio isolation component may be operative on the processor circuit to provide signals to output audio from the audio beam.

Alternatively, or in addition, in a further embodiment the audio isolation component may be operative on the processor circuit to identify the selected position during recording of the video, save the generated audio beam, and discard audio from the multiplicity of audio streams other than the generated audio beam.

Alternatively, or in addition, in a further embodiment the audio isolation component may be operative on the processor circuit to route the audio beam for output at one or more speakers of a set of multichannel speakers such that the audio beam is output based upon the spatial position of the one or more speakers.

Alternatively, or in addition, in a further embodiment the audio isolation component may be operative on the processor circuit to save the audio beam as an audio file having a format that converts the two or more audio streams into a recording represented by the audio beam.

Alternatively, or in addition, in a further embodiment, the apparatus may comprise a set of speakers to output audio from the audio beam.

In another embodiment, a computer implemented method may include identifying a selected position on a display during presentation of a video, where the video comprises a video stream and two or more of audio streams recorded during an event. The computer implemented method may further include generating an audio beam based upon the selected position.

In an additional embodiment, the computer implemented method may include identifying the selected position by determining a position on the display corresponding to manual touchscreen input, input by an electronic indicating device, input by directed eye movement, gesture based input, or voice command input.

Alternatively, or in addition, in a further embodiment, the multiplicity of audio streams may comprise audio recorded from an array of two or more microphones that comprises a linear array or a two dimensional array.

Alternatively, or in addition, in a further embodiment the computer implemented method may include determining an angular displacement of the selected position, receiving audio metadata that includes spatial indicia of microphones used to record the two or more audio streams, and generating the audio beam by applying a beam forming function to the audio metadata.

Alternatively, or in addition, in a further embodiment the computer implemented method may include receiving camera metadata including a field of view of a camera that recorded the video, and determining the angular displacement of the selected position based upon X-Y display coordinates and the field of view.

Alternatively, or in addition, in a further embodiment the computer implemented method may include receiving depth information for a visual element associated with the selected position; and determining the angular displacement based upon the depth information associated with the visual element.

Alternatively, or in addition, in a further embodiment the computer implemented method may include providing signals to output audio from the audio beam.

Alternatively, or in addition, in a further embodiment the computer implemented method may include identifying the selected position during recording of the video, saving the selected portion of the multiplicity of audio streams, saving the generated audio beam, and designating for discard audio from the multiplicity of audio streams other than the generated audio beam.

Alternatively, or in addition, in a further embodiment the computer implemented method may include identifying the selected position during recording of the video, saving the generated audio beam, and designating for discard audio from the multiplicity of audio streams other than the generated audio beam.

Alternatively, or in addition, in a further embodiment the computer implemented method may include saving the audio beam as an audio file having a format that converts the two or more audio streams into a recording represented by the audio beam.

In a further embodiment, an apparatus may be configured to perform the method of any one of the preceding embodiments.

In another embodiment, at least one machine readable medium may comprise a plurality of instructions that in response to being executed on a computing device, cause the computing device to carry out a method according to any one of the preceding embodiments.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a digital display;
   a processor circuit; and
   an audio isolation component operative on the processor circuit to:
      identify a selected position on the digital display during presentation of a video on the digital display, the video comprising a video stream and multiple audio streams, the multiple audio streams comprising audio recorded by an array of microphones prior to the presentation;
      determine, based on the selected position, an angular displacement relative to a lens of a camera used to record the video; and
      generate an audio beam centered at the angular displacement from at least one of the multiple audio streams based upon the selected position.

2. The apparatus of claim 1, the audio isolation component operative on the processor circuit to identify the selected position by determining a position on the digital display corresponding to manual touchscreen input, input by an electronic indicating device, input by directed eye movement, gesture based input, or voice command input.

3. The apparatus of claim 1, the array of microphones comprising a linear array or a two dimensional array.

4. The apparatus of claim 1, the audio isolation component operative on the processor circuit to:
   receive audio metadata that includes spatial indicia of microphones used to record the two or more audio streams; and
   generate the audio beam by applying a beam forming function to the audio metadata.

5. The apparatus of claim 4, the audio isolation component operative on the processor circuit to:
   receive camera metadata including a field of view of a camera that recorded the video; and
   determine the angular displacement of the selected position based upon X-Y display coordinates and the field of view.

6. The apparatus of claim 4, the audio isolation component operative on the processor circuit to:
   receive depth information for a visual element associated with the selected position; and
   determine the angular displacement based upon the depth information associated with the visual element.

7. The apparatus of claim 1, the audio isolation component operative on the processor circuit to determine X-Y coordinates of the selected position by tracking eye movement of a user proximate the display.

8. The apparatus of claim 1, the audio isolation component operative on the processor circuit to provide signals to output audio from the audio beam.

9. The apparatus of claim 1, the audio isolation component operative on the processor circuit to:
identify the selected position during recording of the video;
save the generated audio beam; and
discard audio from at least one other of the multiple audio streams.

10. The apparatus of claim 1, the audio isolation component operative on the processor circuit to route the audio beam for output at one or more speakers of a set of multichannel speakers such that the audio beam is output based upon the spatial position of the one or more speakers.

11. The apparatus of claim 1, the audio isolation component operative on the processor circuit to save the audio beam as an audio file having a format that converts the two or more audio streams into a recording represented by the audio beam.

12. The apparatus of claim 1 comprising a set of speakers to output audio from the audio beam.

13. A computer implemented method, comprising:
identifying a selected position on a display during presentation of a video, the video comprising a video stream and multiple audio streams, the multiple audio streams comprising audio recorded by an array of microphones prior to the presentation;
determining, based on the selected position, an angular displacement relative to a lens of a camera used to record the video; and
generating an audio beam centered at the angular displacement from at least one of the multiple audio streams based upon the selected position.

14. The computer implemented method of claim 13, comprising identifying the selected position by determining a position on the display corresponding to manual touchscreen input, input by an electronic indicating device, input by directed eye movement, gesture based input, or voice command input.

15. The computer implemented method of claim 13, the array of microphones that comprising a linear array or a two dimensional array.

16. The computer implemented method of claim 13 comprising:
receiving audio metadata that includes spatial indicia of microphones used to record the two or more audio streams; and
generating the audio beam by applying a beam forming function to the audio metadata.

17. The computer implemented method of claim 16, comprising:
receiving camera metadata including a field of view of a camera that recorded the video; and
determining the angular displacement of the selected position based upon X-Y display coordinates and the field of view.

18. The computer implemented method of claim 16, comprising:
receiving depth information for a visual element associated with the selected position; and
determining the angular displacement based upon the depth information associated with the visual element.

19. The computer implemented method of claim 13, comprising:
providing signals to output audio from the audio beam.

20. The computer implemented method of claim 13, comprising:
identifying the selected position during recording of the video;
saving the generated audio beam; and
designating for discard audio from at least one other of the multiple audio streams.

21. The computer implemented method of claim 13, comprising routing the audio beam for output at one or more speakers of a set of multichannel speakers such that the audio beam is output based upon the spatial position of the one or more speakers.

22. The computer implemented method of claim 13, comprising saving the audio beam as an audio file having a format that converts the two or more audio streams into a recording represented by the audio beam.

23. At least one non-transitory computer-readable storage medium comprising instructions that, when executed by a processor of a system, cause the system to:
identify a selected position on a digital display during presentation of a video, the video comprising a video stream and multiple audio streams, the multiple audio streams comprising audio recorded by an array of microphones prior to the presentation;
determining, based on the selected position, an angular displacement relative to a lens of a camera used to record the video; and
generate an audio beam centered at the angular displacement from at least one of the multiple audio streams based upon the selected position.

24. The at least one computer-readable storage medium of claim 23, comprising instructions that, when executed, cause a system to identify the selected position by determining a position on the display corresponding to manual touchscreen input, input by an electronic indicating device, input by directed eye movement, gesture based input, or voice command input.

25. The at least one computer-readable storage medium of claim 23, comprising instructions that, when executed, cause a system to:
receive audio metadata that includes spatial indicia of microphones used to record the two or more audio streams; and
generate the audio beam by applying a beam forming function to the audio metadata.

26. The at least one computer-readable storage medium of claim 25, comprising instructions that, when executed, cause a system to:
receive camera metadata including a field of view of a camera that recorded the video; and
determine the angular displacement of the selected position based upon X-Y display coordinates and the field of view.

27. The at least one computer-readable storage medium of claim 25, comprising instructions that, when executed, cause a system to:
receive depth information for a visual element associated with the selected position; and
determine the angular displacement based upon the depth information associated with the visual element.

28. The at least one computer-readable storage medium of claim 23, comprising instructions that, when executed, cause a system to provide signals to output audio from the audio beam.

29. The at least one computer-readable storage medium of claim 23, comprising instructions that, when executed, cause a system to:
identify the selected position during recording of the video;
save the generated audio beam; and
discard audio from at least one other of the audio streams.

30. The at least one computer-readable storage medium of claim 23, comprising instructions that, when executed, cause a system to route the audio beam for output at one or more speakers of a set of multichannel speakers such that the audio beam is output based upon the spatial position of the one or more speakers.

* * * * *

UNITED STATES PATENT AND TRADEMARK OFFICE
CERTIFICATE OF CORRECTION

PATENT NO. : 9,007,524 B2  
APPLICATION NO. : 13/626098  
DATED : April 14, 2015  
INVENTOR(S) : Greg D. Kaine et al.

Page 1 of 1

It is certified that error appears in the above-identified patent and that said Letters Patent is hereby corrected as shown below:

On the Title page, in item (72), in column 1, in "Inventors", line 3, delete "Jered B. Wikander," and insert -- Jered H. Wikander, --, therefor.

Signed and Sealed this
Seventeenth Day of May, 2016

Michelle K. Lee
*Director of the United States Patent and Trademark Office*